(12) United States Patent
Ju et al.

(10) Patent No.: US 9,568,985 B2
(45) Date of Patent: *Feb. 14, 2017

(54) DATA PROCESSING APPARATUS WITH ADAPTIVE COMPRESSION ALGORITHM SELECTION BASED ON VISIBILITY OF COMPRESSION ARTIFACTS FOR DATA COMMUNICATION OVER CAMERA INTERFACE AND RELATED DATA PROCESSING METHOD

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,102

(22) Filed: Aug. 11, 2013

(65) Prior Publication Data

US 2014/0146186 A1 May 29, 2014

Related U.S. Application Data

(60) Provisional application No. 61/729,426, filed on Nov. 23, 2012.

(51) Int. Cl.

| H04N 19/10 | (2014.01) |
|---|---|
| G06F 3/14 | (2006.01) |
| G06F 1/32 | (2006.01) |
| H04N 5/232 | (2006.01) |
| H04N 19/12 | (2014.01) |

(Continued)

(52) U.S. Cl.
CPC ............. *G06F 1/325* (2013.01); *G06F 1/3278* (2013.01); *G06F 3/14* (2013.01); *H04N 5/23235* (2013.01); *H04N 5/23241* (2013.01); *H04N 5/23293* (2013.01); *H04N 19/10* (2014.11); *H04N 19/12* (2014.11); *H04N 19/154* (2014.11); *H04N 19/179* (2014.11); *G09G 2340/02* (2013.01);

(Continued)

(58) Field of Classification Search
CPC ....... H04N 19/10; G06F 3/14; G09G 2340/02; G09G 2340/04
USPC ......................................... 345/501, 520, 660
See application file for complete search history.

(56) References Cited

U.S. PATENT DOCUMENTS 5,502,485 A    3/1996 Suzuki
5,553,160 A *  9/1996 Dawson ........................ 382/166
(Continued)

FOREIGN PATENT DOCUMENTS

CN    1504905 A    6/2004
CN    2724334 Y    9/2005
(Continued)

*Primary Examiner* — Joni Richer
(74) *Attorney, Agent, or Firm* — Winston Hsu; Scott Margo

(57) ABSTRACT

A data processing apparatus has a compressor and an output interface. The compressor receives an input multimedia data, and generates an output multimedia data according to the input multimedia data. The output interface packs the output multimedia data into an output bitstream, and outputs the output bitstream via a camera interface. The compressor adaptively adjusts a compression algorithm applied to the input multimedia data according to visibility of compression artifacts. By way of example, the camera interface may be a camera serial interface (CSI) standardized by a Mobile Industry Processor Interface (MIPI).

16 Claims, 9 Drawing Sheets

(51) Int. Cl.
  *H04N 19/154* (2014.01)
  *H04N 19/179* (2014.01)
(52) U.S. Cl.
  CPC ......... *G09G 2340/04* (2013.01); *Y02B 60/126* (2013.01)

(56) References Cited

U.S. PATENT DOCUMENTS

| | | | |
|---|---|---|---|
| 5,778,191 A | 7/1998 | Levine | |
| 5,894,588 A | 4/1999 | Kawashima | |
| 6,031,929 A * | 2/2000 | Maitz .................... | G06F 19/321 375/E7.076 |
| 6,201,834 B1 | 3/2001 | Zhu | |
| 6,507,672 B1 | 1/2003 | Watkins | |
| 6,704,310 B1 | 3/2004 | Zimmermann | |
| 6,956,971 B1 | 10/2005 | Cho | |
| 7,110,025 B1 | 9/2006 | Loui | |
| 7,394,410 B1 | 7/2008 | Wegener | |
| 8,049,761 B1 | 11/2011 | Riach | |
| 8,599,316 B2 | 12/2013 | Deever | |
| 2002/0015092 A1 | 2/2002 | Feder | |
| 2002/0039139 A1 | 4/2002 | Hsu | |
| 2002/0186963 A1 | 12/2002 | Toyoda | |
| 2003/0165200 A1 | 9/2003 | Pugel | |
| 2003/0234799 A1* | 12/2003 | Lee ............................. | 345/660 |
| 2004/0008772 A1 | 1/2004 | Kojima | |
| 2004/0218816 A1 | 11/2004 | Hannuksela | |
| 2005/0027893 A1 | 2/2005 | Jung | |
| 2005/0195205 A1* | 9/2005 | Abrams, Jr. ................ | 345/545 |
| 2005/0207453 A1* | 9/2005 | Panvalkar et al. ........... | 370/509 |
| 2005/0276496 A1 | 12/2005 | Molgaard | |
| 2006/0222252 A1 | 10/2006 | Lee | |
| 2007/0046683 A1 | 3/2007 | Iga | |
| 2007/0206871 A1 | 9/2007 | Jalil | |
| 2008/0025412 A1 | 1/2008 | Lee | |
| 2008/0076471 A1 | 3/2008 | Yuki | |
| 2008/0170806 A1 | 7/2008 | Kim | |
| 2008/0317117 A1 | 12/2008 | Le Floch | |
| 2009/0086174 A1 | 4/2009 | Fukumoto | |
| 2009/0129219 A1 | 5/2009 | Marumori | |
| 2010/0073574 A1 | 3/2010 | Nakajima | |
| 2010/0149304 A1 | 6/2010 | Chao | |
| 2010/0172599 A1 | 7/2010 | Choi | |
| 2010/0309987 A1 | 12/2010 | Concion | |
| 2011/0075729 A1* | 3/2011 | Dane et al. ............... | 375/240.03 |
| 2011/0206289 A1 | 8/2011 | Dikbas | |
| 2011/0228858 A1 | 9/2011 | Budagavi | |
| 2011/0249723 A1* | 10/2011 | Wasily ..................... | 375/240.03 |
| 2011/0261217 A1 | 10/2011 | Muukki | |
| 2011/0273589 A1 | 11/2011 | Mochimizo | |
| 2012/0120287 A1 | 5/2012 | Funamoto | |
| 2012/0133800 A1* | 5/2012 | Jung et al. ................. | 348/241 |
| 2013/0322517 A1* | 12/2013 | Zurpal ................... | H04N 19/56 375/240.02 |
| 2014/0092439 A1 | 4/2014 | Krig | |
| 2014/0098111 A1 | 4/2014 | Ju | |
| 2014/0098119 A1 | 4/2014 | Ju | |
| 2014/0098893 A1 | 4/2014 | Ju | |
| 2014/0105514 A1 | 4/2014 | Wu | |

FOREIGN PATENT DOCUMENTS

| | | |
|---|---|---|
| CN | 101217623 A | 7/2008 |
| CN | 201127091 Y | 10/2008 |
| CN | 101534448 A | 9/2009 |
| CN | 102547151 A | 7/2012 |
| CN | 202353700 U | 7/2012 |
| CN | 102647611 A | 8/2012 |
| CN | 202551178 U | 11/2012 |
| CN | 102843566 A | 12/2012 |
| CN | 103220492 A | 7/2013 |
| CN | 103294038 A | 9/2013 |
| CN | 103338354 A | 10/2013 |
| EP | 2068228 A2 | 6/2009 |
| TW | 200830170 A | 7/2008 |

* cited by examiner

| Type of Algorithm | Complexity | Power | Ratio M | Compression Efficiency |
|---|---|---|---|---|
| Compression Algorithm 1 | 5 (Highest) | 5 (Highest) | 1/8 | 5 (Highest) |
| Compression Algorithm 2 | 4 | 4 | 1/4 | 4 |
| Compression Algorithm 3 | 3 | 3 | 1/4 | 3 |
| Compression Algorithm 4 | 2 | 2 | 1/2 | 2 |
| Compression Algorithm 5 | 1 (Lowest) | 1 (Lowest) | 1/2 | 1 (Lowest) |

FIG. 2

DATA PROCESSING APPARATUS WITH ADAPTIVE COMPRESSION ALGORITHM SELECTION BASED ON VISIBILITY OF COMPRESSION ARTIFACTS FOR DATA COMMUNICATION OVER CAMERA INTERFACE AND RELATED DATA PROCESSING METHOD

CROSS REFERENCE TO RELATED APPLICATIONS

This application claims the benefit of U.S. provisional application No. 61/729,426, filed on Nov. 23, 2012 and incorporated herein by reference.

BACKGROUND

The disclosed embodiments of the present invention relate to transmitting and receiving multimedia data over a camera interface, and more particularly, to a data processing apparatus with adaptive compression algorithm selection based on visibility of compression artifacts for data communication over a camera interface and related data processing method.

A camera interface is disposed between a first chip and a second chip to transmit multimedia data from the first chip to the second chip for further processing. For example, the first chip may include a camera module, and the second chip may include an image signal processor (ISP). The multimedia data may include image data (i.e., a single captured image) or video data (i.e., a video sequence composed of captured images). When a camera sensor with a higher resolution is employed in the camera module, the multimedia data transmitted over the camera interface would have a larger data size/data rate, which increases the power consumption of the camera interface inevitably. If the camera module and the ISP are both located at a portable device (e.g., a smartphone) powered by a battery device, the battery life is shortened due to the increased power consumption of the camera interface. Thus, there is a need for an innovative design which can effectively reduce the power consumption of the camera interface.

SUMMARY

In accordance with exemplary embodiments of the present invention, a data processing apparatus with adaptive compression algorithm selection based on visibility of compression artifacts for data communication over a camera interface and related data processing method are proposed.

According to a first aspect of the present invention, an exemplary data processing apparatus is disclosed. The exemplary data processing apparatus includes a compressor and an output interface. The compressor is arranged for receiving an input multimedia data and generating an output multimedia data according to the input multimedia data. The output interface is arranged for packing the output multimedia data into an output bitstream, and outputting the output bitstream via a camera interface. The compressor adaptively adjusts a compression algorithm applied to the input multimedia data according to visibility of compression artifacts.

According to a second aspect of the present invention, an exemplary data processing method is disclosed. The exemplary data processing method includes at least the following steps: receiving an input multimedia data; adaptively adjusting a compression algorithm according to visibility of compression artifacts; generating an output multimedia data according to the compression algorithm and the input multimedia data; and packing the output multimedia data into an output bitstream, and outputting the output bitstream via a camera interface.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table showing characteristics of different compression algorithms supported by the compressor shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a multimedia data and then transmitting a compressed multimedia data over a camera interface. As the data size/data rate of the compressed multimedia data is smaller than that of the original un-compressed multimedia data, the power consumption of the camera interface is reduced correspondingly. Besides, the present invention further proposes an adaptive compression scheme which is based on side information given by a display processor, a viewing distance detector and/or a display panel. This may allow the configuration of a compressor to be adjusted in a static or dynamic way according to the side information. In general, data compression is exploited to remove the information redundancy under a specific pixel size (i.e., a unit size of compression) and produce a compressed data constrained by a compression ratio. The compression ratio M may be defined as below.

$$M = \frac{\text{amount of compressed data}}{\text{amount of un-compressed data}}$$

In a case where the compression ratio is equal to 0.5, the size of the compressed data is half of the size of the uncompressed data. As the compression performance is strongly related to some design factors such as the unit size of compression and the constrained compression ratio, the present invention therefore proposes using the adaptive compression scheme for enabling a compression algorithm selected from a plurality of candidate compression algorithms, where the selected compression algorithm most efficiently compresses the multimedia data. Compared to a typical compression scheme using a fixed compression algorithm, the proposed adaptive compression scheme achieves better performance. Further details will be described as below.

Figure 1:
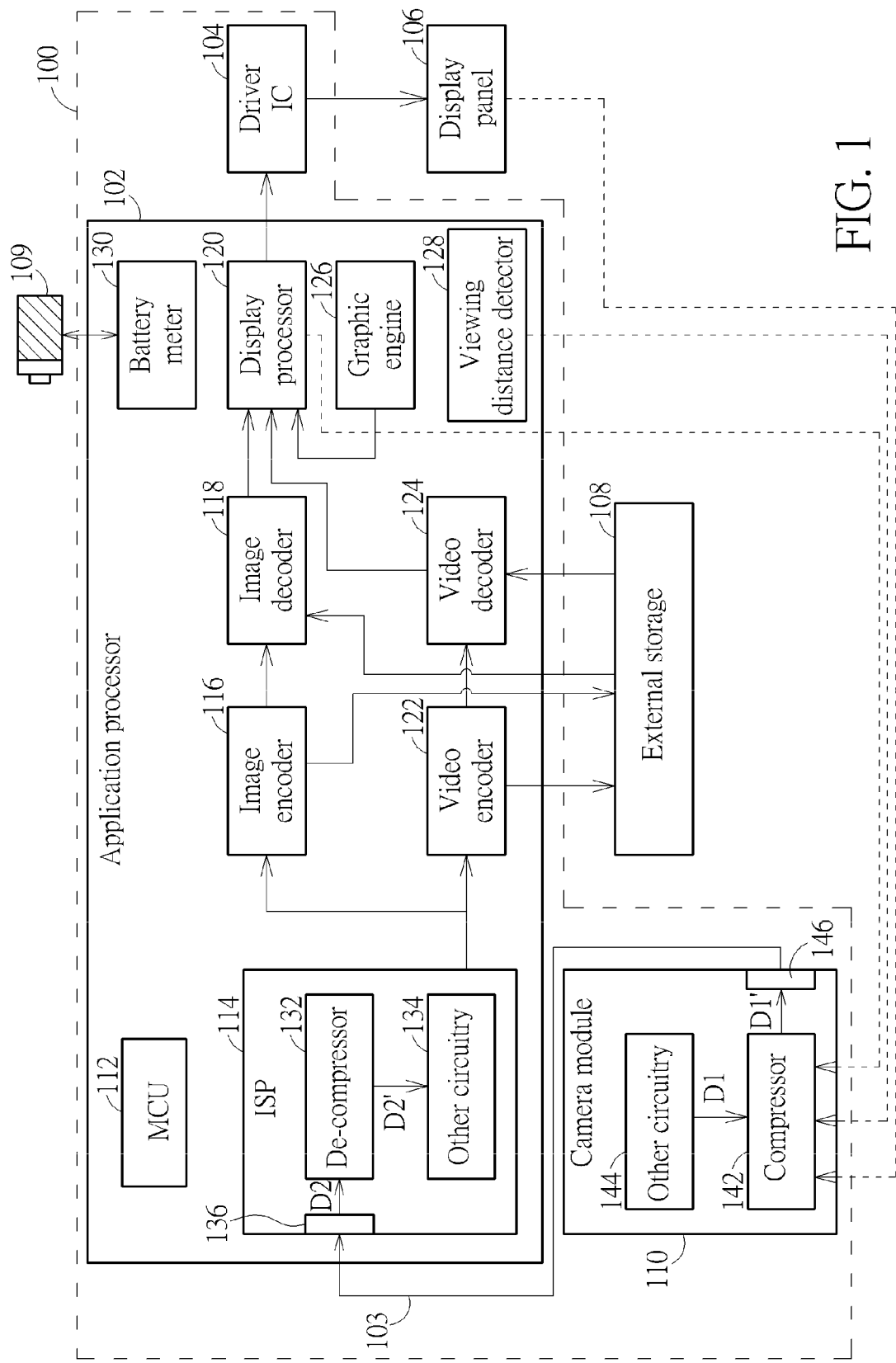
FIG. 1 is a block diagram illustrating a data processing system according to an embodiment of the present invention.

FIG. 1 is a block diagram illustrating a data processing system according to an embodiment of the present invention. The data processing system 100 includes a plurality of data processing apparatuses such as a camera module 110 external to an application processor 102 and an image signal processor (ISP) 114 included in the application processor 102. The camera module 110 and the ISP 114 may be implemented in different chips, and the camera module 110 communicates with the ISP 114 via a camera interface 103. Alternatively, the ISP 114 may be integrated within the camera module 110, and a single chip having the ISP 114 and the camera module 110 included therein communicates with another data processing apparatus in the application processor 102 via the camera interface 103. In this embodiment, the camera interface 103 may be a camera serial interface (CSI) standardized by a Mobile Industry Processor Interface (MIPI).

The camera module 110 is coupled to the camera interface 103, and supports un-compressed data transmission and compressed data transmission. When the camera module 110 is used to transmit un-compressed data to the ISP 114, the camera module 110 generates an un-compressed multimedia data, and transmits the un-compressed multimedia data over the camera interface 103. When the camera module 110 is used to transmit compressed data to the ISP 114, the camera module 110 generates a compressed multimedia data, and transmits the compressed multimedia data over the camera interface 103.

As shown in FIG. 1, the camera module 110 includes a compressor 142, other circuitry 144, and an output interface 146. Other circuitry 144 includes circuit elements required for capturing incident light to obtain an input multimedia data D1. For example, other circuitry 144 may have a lens module, a camera sensor, a camera controller, a camera buffer, multiplexer(s), etc. When the camera module 110 is operated in a compression mode, the compressor 142 performs data compression upon the input multimedia data D1 generated from other circuitry 144, and accordingly generates an output multimedia data D1', wherein the compressed multimedia data (i.e., output multimedia data D1') is packed/packetized into an output bitstream by the output interface 146 according to the transmission protocol of the camera interface 103, and the output bitstream is transmitted to the ISP 114 via the camera interface 103.

Regarding the ISP 114, it is coupled to the camera interface 103, and supports un-compressed data reception and compressed data reception. When the camera module 110 transmits the un-compressed data to the ISP 114, the ISP 114 is operated under a non-decompression mode to receive an un-compressed data from the camera interface 103 and generate a processed multimedia data according to the un-compressed multimedia data. When the camera module 110 transmits the compressed data to the ISP 114, the ISP 114 is operated under a de-compression mode to receive a compressed multimedia data from the camera interface 103 and generate the processed multimedia data according to a de-compressed multimedia data derived from de-compressing the compressed multimedia data. If there is no error introduced during the data transmission, the un-compressed data transmitted under the non-compression mode should be identical to the un-compressed data received under the non-decompression mode, and the compressed data transmitted under the compression mode should be identical to the compressed data received under the de-compression mode.

As shown in FIG. 1, the ISP 114 includes a de-compressor 132, other circuitry 134, and an input interface 136. The input interface 136 receives an input bitstream from the camera interface 103, and un-packs/un-packetizes the input bitstream into an input multimedia data D2 which is a compressed multimedia data when the camera module 110 is operated under the compression mode. In this embodiment, the de-compressor 132 is arranged to perform data de-compression upon the input multimedia data D2, and accordingly generate a de-compressed multimedia data D2'. Other circuitry 134 is arranged to generate a processed multimedia data according to the de-compressed multimedia data D2'. Specifically, other circuitry 134 includes circuit elements required for generating the processed multimedia data according to an internal transmission mode (e.g., an on-the-fly mode or an off-line mode). For example, other circuitry 134 may have a write direct memory access (DMA) controller, a read DMA controller, an image processor, multiplexers, etc.

As the present invention focuses on the adaptive compression and de-compression scheme for configuring the compressor 142 and the de-compressor 132, further details directed to transmitting compressed/un-compressed multimedia data from the camera module 110 to the ISP 114 via the camera interface 103 and generating the processed multimedia data based on the compressed/un-compressed multimedia data received from the camera interface 103 are omitted here for brevity.

As shown in FIG. 1, the application processor 102 further includes a micro control unit (MCU) 112, an image encoder 116, an image decoder 118, a display processor 120, a video encoder 122, a video decoder 124, a graphic engine 126, and a battery meter 130. The battery meter 130 is arranged to monitor the power status of a power source such as the battery capacity of a battery device 109. In this embodiment, the camera module 110 and other data processing apparatuses shown in FIG. 1 are powered by the battery device 109. The MCU 112 serves as a display controller used for controlling generation of a display data, and therefore controls circuit elements within the application processor 102 to generate a desired display data to the driver IC 104. In other words, the MCU 112 controls the operation of the application processor 102. The ISP 114 serves as a backend processor for an image/video output of the camera module 110. For example, the ISP 114 may be used to perform auto white balance (AWB), auto exposure (AE) and auto focus (AF). In a case where the camera module 110 generates a single captured image to the ISP 114 under a photo mode, a processed image generated from the ISP 114 may be transmitted to the image encoder 116, and an encoded image is generated from the image encoder 116 to an external storage 108 such as a dynamic random access memory (DRAM). In another case where the camera module 110 generates a video sequence composed of successive captured images to the ISP 114 under a video recording mode, a processed video generated from the ISP 114 may be transmitted to the video encoder 122, and an encoded video is generated from the video encoder 122 to the external storage 108.

The image decoder 118 receives an encoded image from the external storage 108, and generates a decoded image to the display processor 120. The video decoder 124 receives an encoded video from the external storage 108, and generates a decoded video to the display processor 120. However, it is possible that the single captured image/video sequence generated from the ISP 114 may be bypassed to the display processor 120 without additional encoding and decoding operations applied thereto. The graphic engine 126 generates graphic data (e.g., a 3D graphic image) to the display processor 120.

The display processor 120 is arranged to generate a display data based on one or more of the image data, video data, graphic data, etc., and transmit the display data to a driver integrated circuit (IC) 104. Hence, the display data generated at the application processor 102 is derived from the output multimedia D1' transmitted from the camera module 110 to the ISP 114 via the camera interface 103. For example, the display processor 120 may combine video data, text data and graphic data to generate a multimedia data of a frame, such that the display of the frame would show a graphic scene, a web-browsing text content, and a video playback content. The driver IC 104 is coupled between the display processor 120 and a display panel 106, and drives the display panel 106 according to the display data generated from the display processor 120. By way of example, the display panel 106 may be implemented using any 2D/3D display device (e.g. a retina display), and the pixel arrangement may be a rectangle layout, a triangle layout or a pentile layout.

In this embodiment, the compressor 142 supports a plurality of compression algorithms having different compression characteristics. Please refer to FIG. 2, which is a table showing characteristics of different compression algorithms supported by the compressor 142 shown in FIG. 1. A compression algorithm represents a set of coding tools so as to remove the data redundancy on the input multimedia data D1. The coding tools may be any kind of compression methods developed by proprietary algorithms or specified by state-of-the-art video standards (e.g., MPEG-1/2/4, H.261/262/263/264, and HEVC) or image standards (e.g., PEG, JPEG-1s, JPEG-2000, JPEG-XR, PNG, and GIF). As shown in FIG. 2, these compression algorithms indicate different capability of compression performance in terms of compression ratio, compression efficiency, compression complexity, and power dissipation. Specifically, the compression efficiency is the ability of a compression algorithm to encode the input multimedia data D1 at the lowest possible bit rate while maintaining a certain level of visual quality. There are two standard ways to measure the compression efficiency of a compression algorithm. One is to use an objective metric, such as a peak signal-to-noise ratio (PSNR). The other is to use a subjective assessment of video/image quality. If the compression efficiency of a compression algorithm is high, it means that the compression algorithm can preserve more input data information after compression is performed under a certain compression ratio. If the compression efficiency of a compression algorithm is low, it means that the compression algorithm will lose more input data information after compression is performed under a certain compression ratio. Hence, a high compression efficiency algorithm can preserve more input data information under a certain compression ratio, and the de-compressed multimedia data can have better visual appearance and visual quality.

In this embodiment, the compressor 142 is capable of adaptively adjusting a compression algorithm by referring to at least the side information shown as dotted lines in FIG. 1, where the side information may be provided by at least one of viewing distance detector 128, display processor 120, and display panel 106. As the compressor 142 refers to the side information to select an adequate compression algorithm from supported compression algorithms having different compression characteristics, the compression performance can be optimized. For better understanding of technical features of the present invention, several embodiments are illustrated as below.

Specifically, the compressor 142 adaptively adjusts a compression algorithm applied to the input multimedia data D1 according to visibility of compression artifacts. The compression artifacts by lossy compression algorithms are generally related to the pixel size of the processed image. A large pixel size indicates higher probability of artifact occurrence which may be easily perceived by human eyes, while a smaller pixel size means the compression error may not be noticeable. The pixel size depends on the display panel size and the image resolution. By way of example, pixels per inch (PPI) or pixel density may serve as a measurement of visibility of compression artifacts. In a case where a 5-inch display panel is used to display an image with an image resolution of 1920×1080, the diagonal resolution in pixels $D_P$ is equal to $\sqrt{1920^2+1080^2}$, and the diagonal resolution in inches $D_i$ is 5. Hence, the PPI value under such a display condition may be expressed using the following equation.

$$PPI=D_P/D_i=\sqrt{1920^2+1080^2}/5=440 \quad (1)$$

Figure 3:
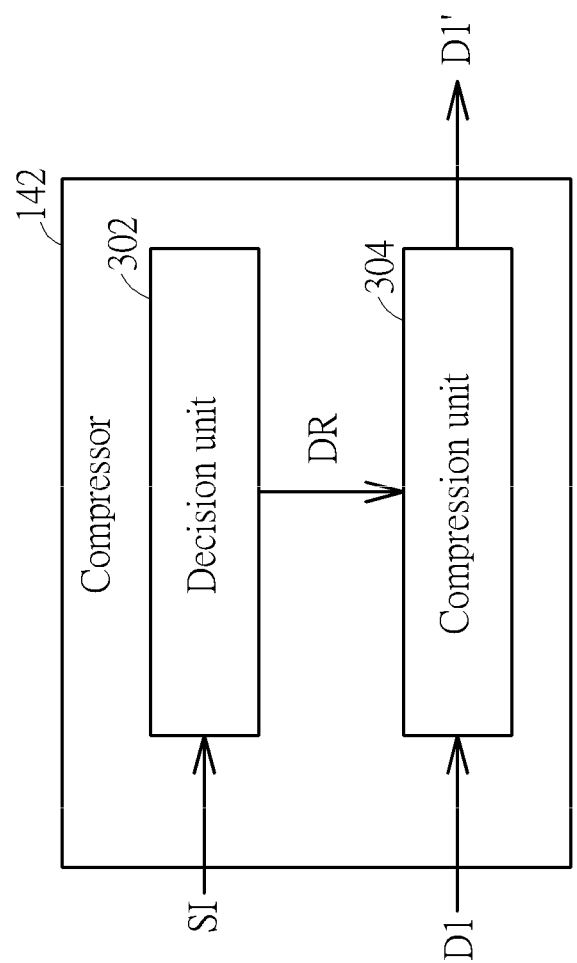
FIG. 3 is a diagram illustrating an embodiment of the compressor shown in FIG. 1.
Figure 4:
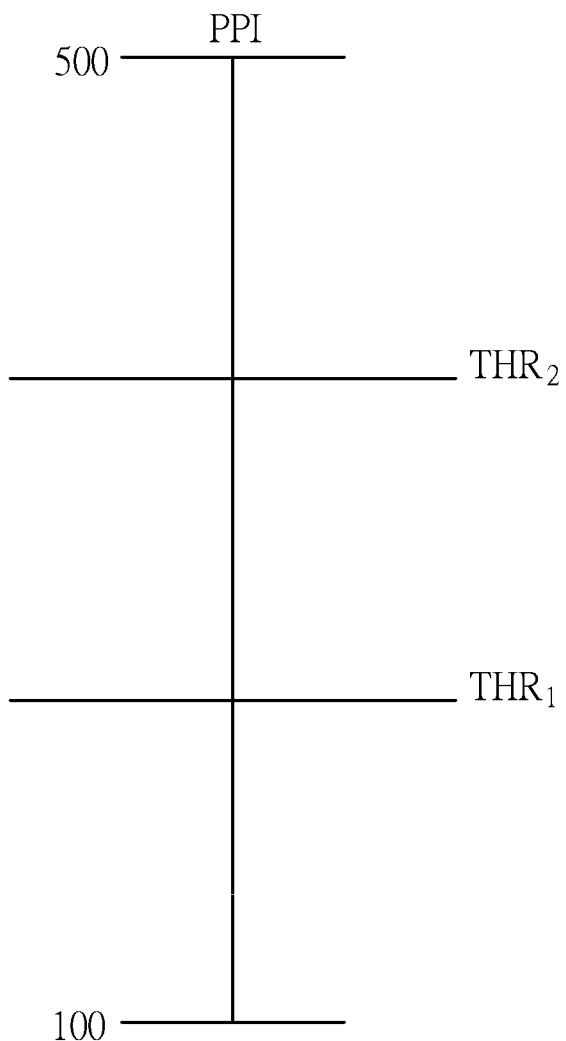
FIG. 4 is a diagram illustrating thresholds of the PPI value.

The pixel size is inversely proportional to the PPI value. That is, the larger is the PPI value, the pixel size is smaller. Therefore, the PPI value is indicative of the visibility of compression artifacts. In a first exemplary embodiment, the compressor 142 may adaptively adjust a compression algorithm applied to the input multimedia data D1 according to a pixel density of a display apparatus (e.g., the PPI value of the display panel 106). Please refer to FIG. 3, which is a diagram illustrating an embodiment of the compressor 142 shown in FIG. 1. The compressor 142 includes a decision unit 302 and a compression unit 304. The decision unit 302 may receive side information SI from the display panel 106 and the display processor 120, and estimates the PPI value of the display panel 106 based on the display panel size and the image resolution included in the side information SI. In addition, the decision unit 302 compares the obtained PPI value with at least one predetermined threshold to generate a decision result DR. The compression unit 304 supports a plurality of compression algorithms having different characteristics, and refers to the decision result DR to select one of the supported compression algorithms for data compression. For example, as shown in FIG. 4, the decision unit 302 employs a first predetermined threshold $THR_1$ and a second predetermined threshold $THR_2$, where $THR_2 > THR_1$. The compression algorithm is adaptively chosen according to the physical PPI value from display's point of view. When the PPI value is large (i.e., pixel size is small), the compression artifacts are hard to be seen by the end-user, and a less complex and lower power dissipation compression algorithm may be selected to save power. When the PPI value is small (i.e., pixel size is large), the compression artifacts are easier to be seen by the end-user, and a more complex and higher power dissipation compression algorithm is selected to ensure visual quality.

Based on above observation, the first predetermined threshold $THR_1$ may be checked to see if the data compression with fewer compression artifacts should be employed to avoid visual quality degradation, and the second predetermined threshold $THR_2$ may be checked to see if the data compression with more compression artifacts is allowed to be used for reducing the power consumption. Hence, the compressor 142 is arranged to employ the compression algorithm $N_1$ when the decision result DR indicates that the PPI value is smaller than the first predetermined threshold $THR_1$ (i.e., visibility of compression artifacts is high), employ the compression algorithm $N_2$ when the decision result DR indicates that the PPI value is between the first predetermined threshold $THR_1$ and the second predetermined threshold $THR_2$ (i.e., visibility of compression artifacts is medium), and employ the compression algorithm $N_3$ when the decision result DR indicates that the PPI value is larger than the second predetermined threshold $THR_2$ (i.e., visibility of compression artifacts is low). The compression algorithm $N_1$ is more complex than the compression algorithm $N_2$, and/or the compression algorithm $N_1$ has a higher compression efficiency than the compression algorithm $N_2$. Besides, the compression algorithm $N_2$ is more complex than the compression algorithm $N_3$, and/or the compression algorithm $N_2$ has a higher compression efficiency than the compression algorithm $N_3$. To put it simply, the compression algorithm used by the compressor 142 is set by a first compression algorithm when the pixel density is higher than a predetermined threshold, and the compression algorithm used by the compressor 142 is set by a second compression algorithm when the pixel density is not higher than the predetermined threshold, where the second compression algorithm is more complex than the first compression algorithm.

Figure 5:
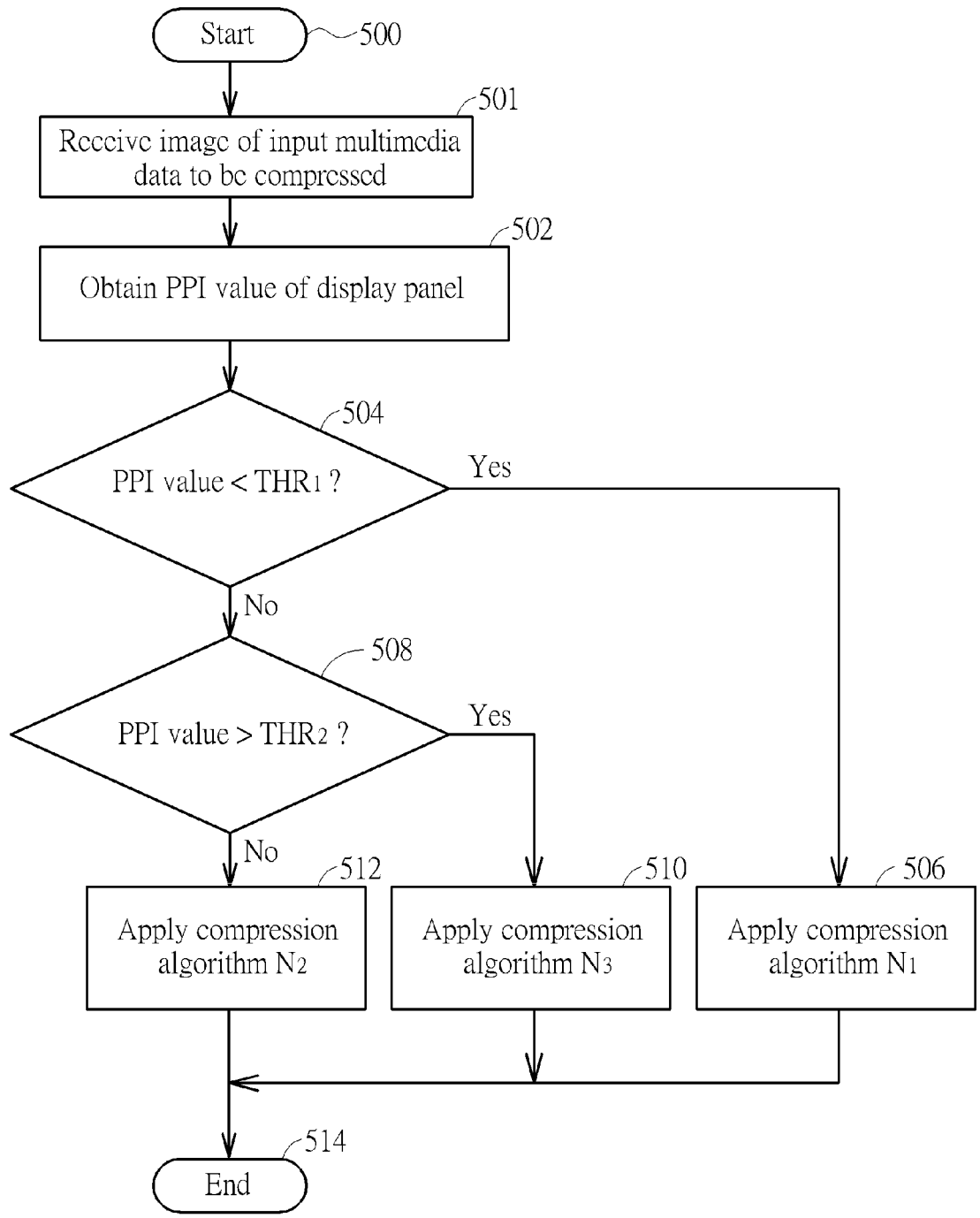
FIG. 5 is a flowchart illustrating an adaptive compression method based on a pixel density of a display apparatus according to an embodiment of the present invention.

FIG. 5 is a flowchart illustrating an adaptive compression method based on a pixel density of a display apparatus according to an embodiment of the present invention. Provided that the result is substantially the same, the steps are not required to be executed in the exact order shown in FIG. 5. The exemplary adaptive compression method may be briefly summarized by following steps.

Step 500: Start.

Step 501: Receive an image of the input multimedia data D1 to be compressed.

Step 502: Refer to side information SI to obtain the PPI value of the display panel 106.

Step 504: Check if the PPI value is smaller than the first predetermined threshold $THR_1$. If yes, go to step 506; otherwise, go to step 508.

Step 506: Apply the compression algorithm $N_1$ to the image. Go to step 514.

Step 508: Check if the PPI value is larger than the second predetermined threshold $THR_2$. If yes, go to step 510; otherwise, go to step 512.

Step 510: Apply the compression algorithm $N_3$ to the image. Go to step 514.

Step 512: Apply the compression algorithm $N_2$ to the image.

Step 514: End.

It should be noted that steps 502, 504, 508 are performed by the decision unit 302, and steps 501, 506, 510, 512 are performed by the compression unit 304. As a person skilled in the art can readily understand details of each step shown in FIG. 5 after reading above paragraphs, further description is omitted here for brevity.

As mentioned above, the display processor 120 may employ an image scaling ratio to scale up or down each image included in a processed multimedia data generated by the ISP 114, and then generate the display data to the driver IC 104. Thus, the image resolution may be scaled up or down by the display processor 120, which affects the pixel size correspondingly. The side information SI received by the decision unit 302 may further include the image scaling ratio. Therefore, the decision unit 302 may further refer to the image scaling ratio to determine the decision result DR. The decision unit 302 obtains the PPI value based on the display panel size and the scaled-up/scaled-down image resolution, and then compares the PPI value with at least one predetermined threshold (e.g., $THR_1$ and $THR_2$) to determine the decision result DR. More specifically, the compressor 142 is arranged to employ a first compression algorithm for compressing the input multimedia data D1 when the image scaling factor is larger than a predetermined threshold, and employ a second compression algorithm for compressing the input multimedia data D1 when the image scaling factor is not larger than the predetermined threshold. By way of example, when the image scaling factor is a scaling-up factor, the first compression algorithm is more complex than the second compression algorithm; and when the image scaling factor is a scaling-down factor, the first compression algorithm is less complex than the second compression algorithm.

Figure 6:
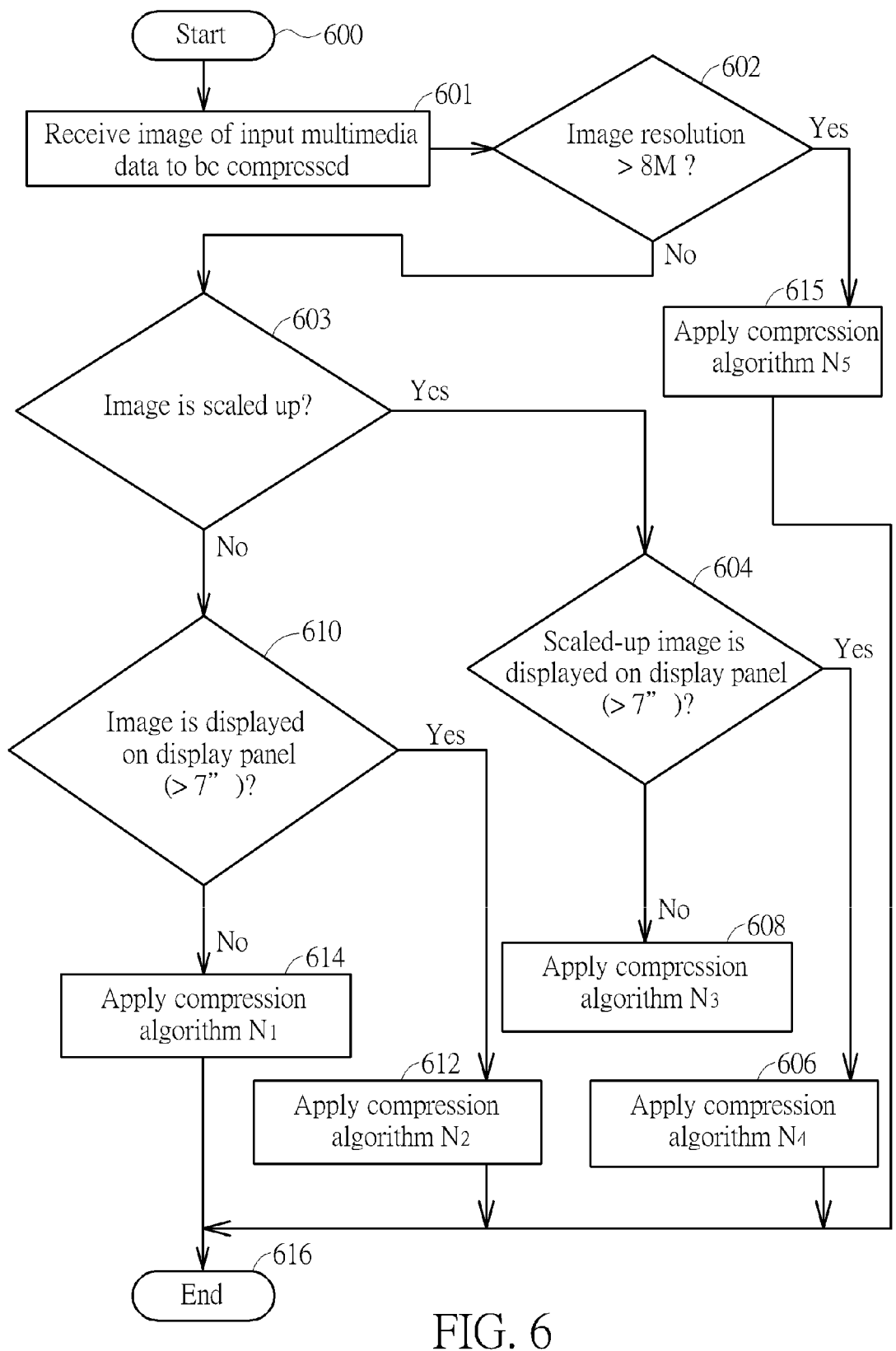
FIG. 6 is a flowchart illustrating an adaptive compression method based on a pixel density of a display apparatus according to another embodiment of the present invention.

FIG. 6 is a flowchart illustrating an adaptive compression method based on a pixel density of a display apparatus according to another embodiment of the present invention. Provided that the result is substantially the same, the steps are not required to be executed in the exact order shown in FIG. 6. The exemplary adaptive compression method may be briefly summarized by following steps.

Step 600: Start.

Step 601: Receive an image of the input multimedia data D1 to be compressed.

Step 602: Check if the captured image resolution is greater than 8M (8-Mega pixels, that is, 3264×2448). If yes, go to step 615; otherwise, go to step 603.

Step 603: Refer to side information SI to determine if the image is scaled up. If yes, go to step 604; otherwise, go to step 610.

Step 604: Refer to the side information SI to check if the scaled-up image is to be displayed on the display panel 106 with a panel size larger than a predetermined threshold (e.g., 7-inch). If yes, go to step 606; otherwise, go to step 608.

Step 606: Apply the compression algorithm $N_4$ to the scaled-up image. Go to step 616.

Step 608: Apply the compression algorithm $N_3$ to the scaled-up image. Go to step 616.

Step 610: Refer to the side information SI to check if the image is to be displayed on the display panel 106 with a panel size larger than the predetermined threshold (e.g., 7-inch). If yes, go to step 612; otherwise, go to step 614.

Step 612: Apply the compression algorithm $N_2$ to the image. Go to step 616.

Step 614: Apply the compression algorithm $N_1$ to the image. Go to step 616.

Step 615: Apply the compression algorithm $N_5$ to the image.

Step 616: End.

As shown in FIG. 6, one of five different compression algorithms $N_1$-$N_5$ is selected by the compressor 142 based on the PPI value determined by the display panel size and the image resolution. The same objective of adaptively adjusting the compression algorithm according to the display density of the display apparatus is achieved.

In above embodiments, the compression algorithm is adaptively chosen according to the physical PPI value from display's point of view. In an alternative design, the compression algorithm may be adaptively chosen according to a virtual PPI value from sensor's point of view. More specifically, the pixel size perceived by a viewer is related to the viewing distance between the viewer and a display apparatus such as the display panel 106, where the viewing distance may be estimated using an appropriate sensor. As shown in FIG. 1, the viewing distance detector 128 is arranged to detect the viewing distance between the viewer and the display panel 106, and provides the side information indicative of the detected viewing distance to the compressor 142. By way of example, but not limitation, the viewing distance detector 128 may be implemented using a distance sensor, an active infrared ray (IR) range meter, or a human face detector which estimates the distance according to the size of the human face. For example, one implementation of the human face detector may compare the captured human face identified in the image generated from a camera sensor in the camera module 110 with a normal human face size to determine the viewing distance.

Figure 7:
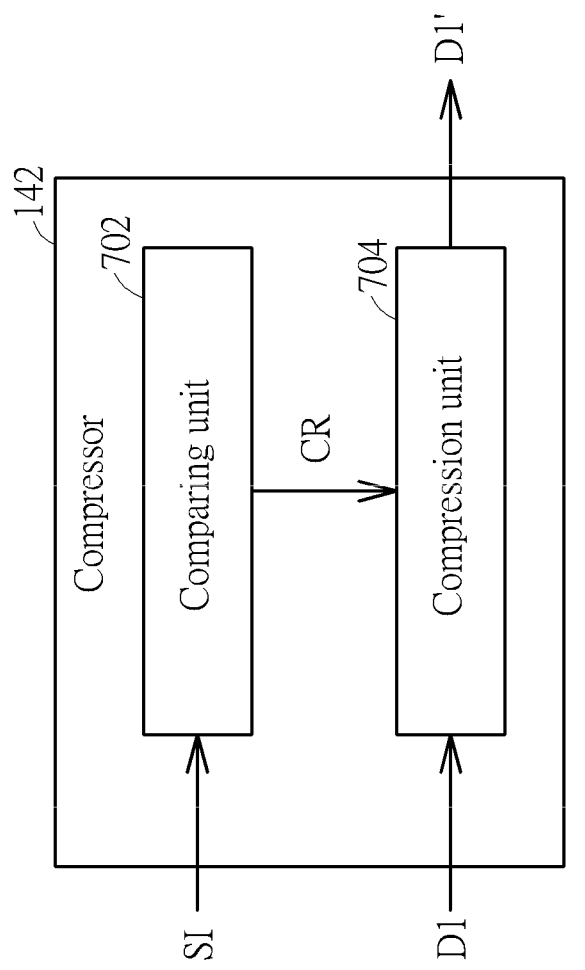
FIG. 7 is a diagram illustrating another embodiment of the compressor shown in FIG. 1.
Figure 8:
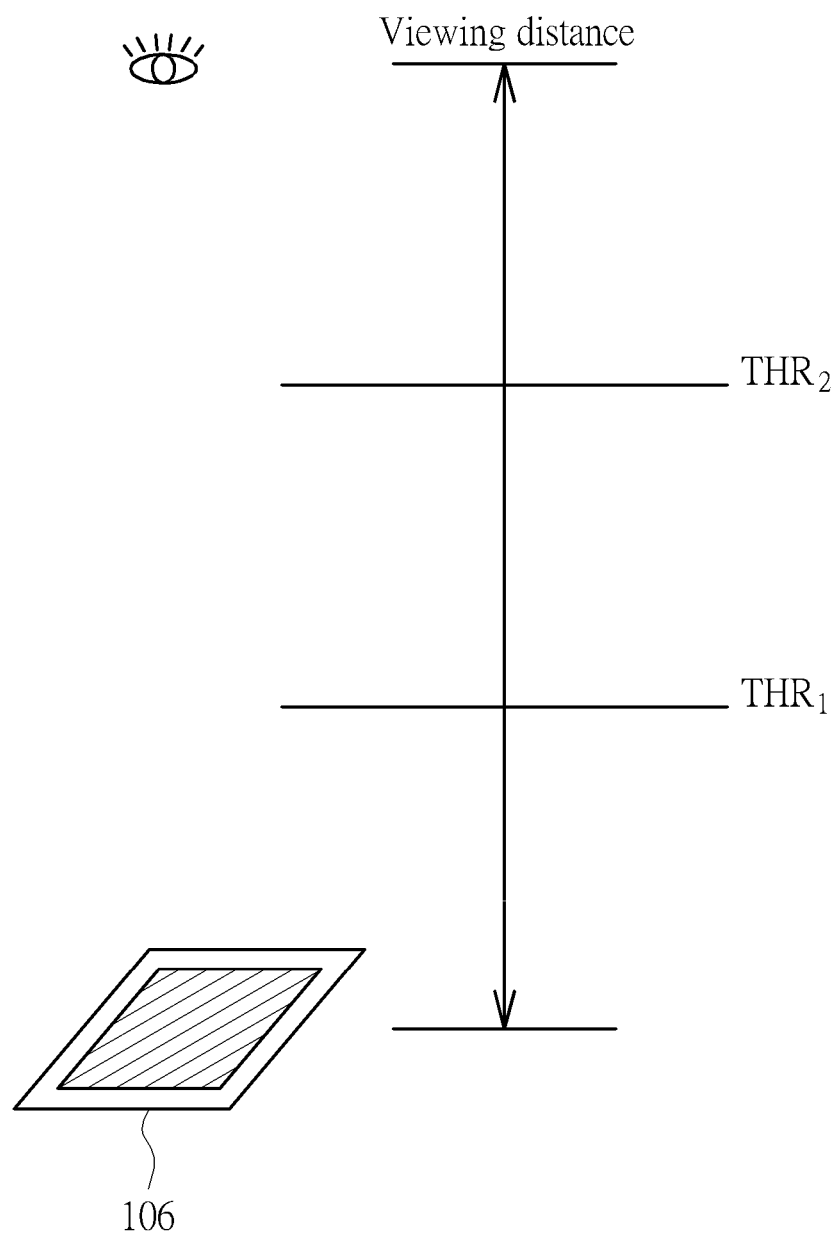
FIG. 8 is a diagram illustrating thresholds of the viewing distance.

In a second exemplary embodiment, the compressor 142 may adaptively adjust a compression algorithm applied to the input multimedia data D1 according to the distance between the display apparatus and the viewer of the display apparatus (e.g., the viewing distance detected by the viewing distance detector 128). Please refer to FIG. 7, which is a diagram illustrating another embodiment of the compressor 142 shown in FIG. 1. The compressor 142 includes a comparing unit 702 and a compression unit 704. The comparing unit 702 may receive side information SI from the viewing distance detector 128, and compares the detected viewing distance with at least one predetermined threshold to generate a comparison result CR. The compression unit 704 supports a plurality of compression algorithms having different characteristics, and refers to the comparison result CR to select one of the supported compression algorithms for data compression. For example, as shown in FIG. 8, the comparing unit 702 employs a first predetermined threshold $THR_1$ and a second predetermined threshold $THR_2$, where $THR_2$>$THR_1$. The compression algorithm is adaptively chosen according to the virtual PPI value from sensor's point of view. When the viewing distance is far (i.e., the perceived pixel size is small), the compression artifacts are hard to be seen by the viewer of the display panel 106, a less complex and lower power dissipation compression algorithm is selected to save power. When the viewing distance is near (i.e., the perceived pixel size is large), the compression artifacts are easier to be seen by the viewer of the display panel 106, a more complex and higher power dissipation compression algorithm is selected to ensure visual quality.

Based on above observation, the first predetermined threshold $THR_1$ may be checked to see if the data compression with fewer compression artifacts should be employed to avoid visual quality degradation, and the second predetermined threshold $THR_2$ may be checked to see if the data compression with more compression artifacts is allowed to be used for reducing the power consumption. More specifically, the compressor 142 is arranged to employ the compression algorithm $N_1$ when the comparing result CR indicates that the detected viewing distance is smaller than the first predetermined threshold $THR_1$ (i.e., visibility of compression artifacts is high), employ the compression algorithm $N_2$ when the comparison result CR indicates that the detected viewing distance is between the first predetermined threshold $THR_1$ and the second predetermined threshold $THR_2$ (i.e., visibility of compression artifacts is medium), and employ the compression algorithm $N_3$ when the comparison result CR indicates that the detected viewing distance is larger than the second predetermined threshold $THR_2$ (i.e., visibility of compression artifacts is low). The compression algorithm $N_1$ is more complex than the compression algorithm $N_2$, and/or the compression algorithm $N_1$ has a higher compression efficiency than the compression algorithm $N_2$. Besides, the compression algorithm $N_2$ is more complex than the compression algorithm $N_3$, and/or the compression algorithm $N_2$ has a higher compression efficiency than the compression algorithm $N_3$. To put it simply, the compression algorithm used by the compressor 142 is set by a first compression algorithm when the distance is smaller than a predetermined threshold, and the compression algorithm used by the compressor 142 is set by a second compression algorithm when the distance is not smaller than the predetermined threshold, where the first compression algorithm is more complex than the second compression algorithm.

Figure 9:
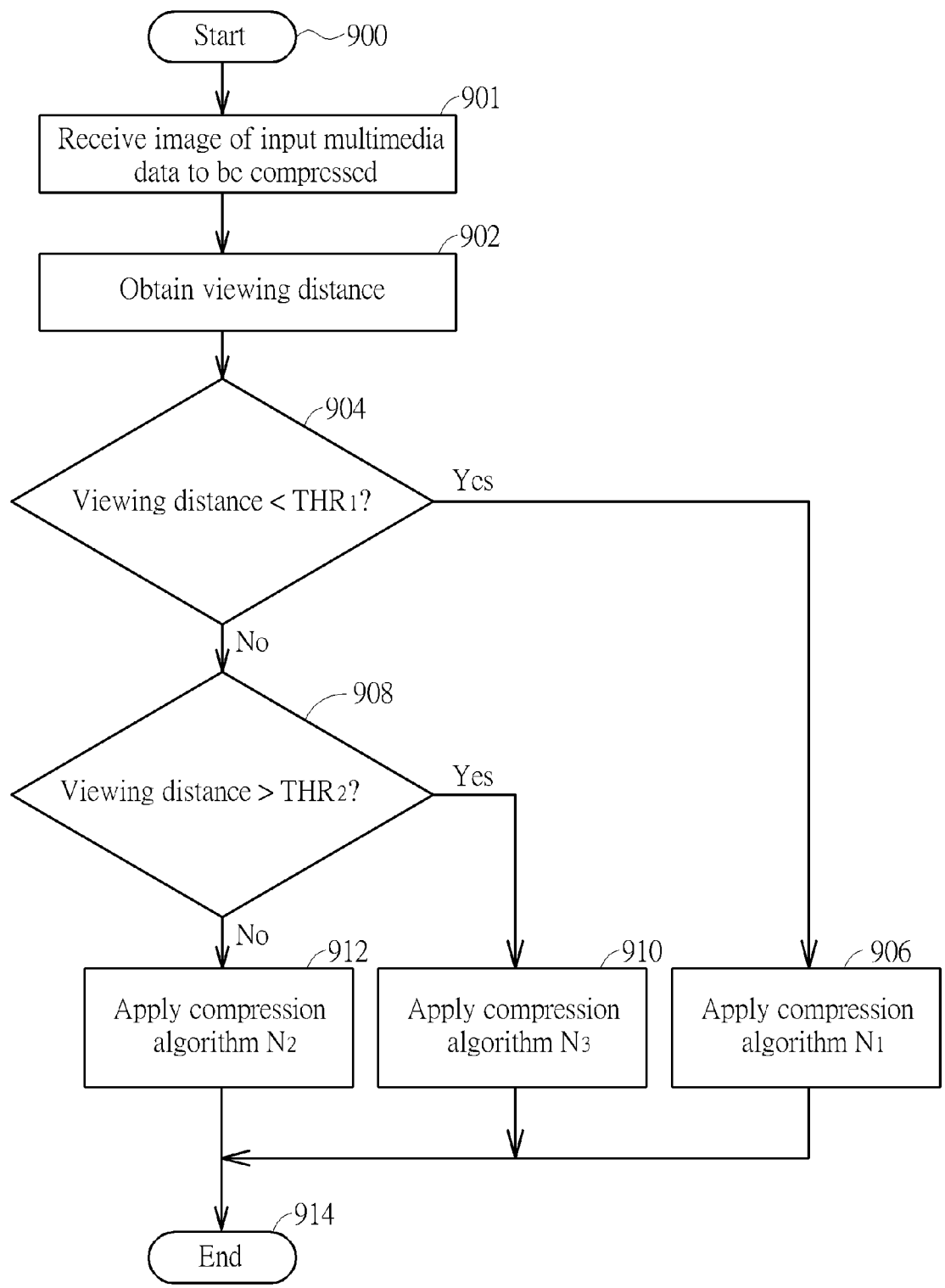
FIG. 9 is a flowchart illustrating an adaptive compression method based on a distance between a display apparatus and a viewer according to an embodiment of the present invention.

FIG. 9 is a flowchart illustrating an adaptive compression method based on a distance between a display apparatus and a viewer according to an embodiment of the present invention. Provided that the result is substantially the same, the steps are not required to be executed in the exact order shown in FIG. 9. The exemplary adaptive compression method may be briefly summarized by following steps.

Step 900: Start.

Step 901: Receive an image of the input multimedia data D1 to be compressed.

Step 902: Refer to side information SI to obtain the detected viewing distance.

Step 904: Check if the detected viewing distance is smaller than the first predetermined threshold $THR_1$. If yes, go to step 906; otherwise, go to step 908.

Step 906: Apply the compression algorithm $N_1$ to the image. Go to step 914.

Step 908: Check if the detected viewing distance is larger than the second predetermined threshold $THR_2$. If yes, go to step 910; otherwise, go to step 912.

Step 910: Apply the compression algorithm $N_3$ to the image. Go to step 914.

Step 912: Apply the compression algorithm $N_2$ to the image.

Step 914: End.

It should be noted that steps 902, 904, 908 are performed by the comparison unit 702, and steps 901, 906, 910, 912 are performed by the compression unit 704. As a person skilled in the art can readily understand details of each step shown in FIG. 9 after reading above paragraphs, further description is omitted here for brevity.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A data processing apparatus comprising:
a compressor, arranged for receiving an input multimedia data and generating an output multimedia data according to the input multimedia data; and
an output interface, arranged for packing the output multimedia data into an output bitstream, and outputting the output bitstream via a camera interface;
wherein the compressor adaptively adjusts a compression algorithm applied to the input multimedia data according to visibility of compression artifacts by referring to at least a pixel density of a display apparatus or referring to at least a distance between the display apparatus and a viewer of the display apparatus; and
wherein a display data derived from the output multimedia data transmitted via the camera interface is displayed on the display apparatus, and the compressor adaptively adjusts the compression algorithm by referring to at least the pixel density of the display apparatus or at least the distance between the display apparatus and the viewer of the display apparatus, wherein when referring to at least the pixel density, the compressor is arranged to employ a first compression algorithm as the compression algorithm when the pixel density is higher than a first predetermined threshold, and employ a second compression algorithm as the compression algorithm when the pixel density is not higher than the first predetermined threshold, and when referring to at least the distance, the compressor is arranged to employ a third compression algorithm as the compression algorithm when the distance is smaller than a second predetermined threshold, and employ a fourth compression algorithm as the compression algorithm when the distance is not smaller than the second predetermined threshold, where the second compression algorithm is different from the first compression algorithm and the fourth compression algorithm is different from the third compression algorithm.

2. The data processing apparatus of claim 1, wherein the camera interface is a camera serial interface (CSI) standardized by a Mobile Industry Processor Interface (MIPI).

3. The data processing apparatus of claim 1, wherein the second compression algorithm is more complex than the first compression algorithm.

4. The data processing apparatus of claim 1, wherein the compressor adaptively adjusts the compression algorithm by referring to at least a scaling factor associated with a de-compressed multimedia data to be derived from the output multimedia data.

5. The data processing apparatus of claim 4, wherein the compressor is arranged to employ a fifth compression algorithm as the compression algorithm when the scaling factor is higher than a third predetermined threshold, and employ a sixth compression algorithm as the compression algorithm when the scaling factor is not higher than the third predetermined threshold, where the sixth compression algorithm is different from the fifth compression algorithm.

6. The data processing apparatus of claim 5, wherein when the scaling factor is a scaling-up factor, the fifth compression algorithm is more complex than the sixth compression algorithm; and when the scaling factor is a scaling-down factor, the fifth compression algorithm is less complex than the sixth compression algorithm.

7. The data processing apparatus of claim 1, wherein the third compression algorithm is more complex than the fourth compression algorithm.

8. A data processing method comprising:
receiving an input multimedia data;
adaptively adjusting a compression algorithm according to visibility of compression artifacts by referring to at least a pixel density of a display apparatus or referring to at least a distance between the display apparatus and a viewer of the display apparatus;
generating an output multimedia data according to the compression algorithm and the input multimedia data; and
packing the output multimedia data into an output bitstream, and outputting the output bitstream via a camera interface;
wherein a display data derived from the output multimedia data transmitted via the camera interface is displayed on the display apparatus, and the step of adaptively adjusting the compression algorithm comprises:
referring to at least the pixel density of the display apparatus or referring to at least the distance between the display apparatus and the viewer of the display apparatus to adaptively adjust the compression algorithm;
wherein when the compression algorithm is adaptively adjusted by referring to at least the pixel density, the compression algorithm is set by a first compression algorithm when the pixel density is higher than a first predetermined threshold, and the compression algorithm is set by a second compression algorithm when the pixel density is not higher than the first predetermined threshold, and when the compression algorithm is adaptively adjusted by referring to at least the distance, the compression algorithm is set by a third compression algorithm when the distance is smaller than a second predetermined threshold, and the compression algorithm is set by a fourth compression algorithm when the distance is not smaller than the second predetermined threshold, where the second compression algorithm is different from the first compression algorithm and the fourth compression algorithm is different from the third compression algorithm.

9. The data processing method of claim 8, wherein the camera interface is a camera serial interface (CSI) standardized by a Mobile Industry Processor Interface (MIPI).

10. The data processing method of claim 8, wherein the second compression algorithm is more complex than the first compression algorithm.

11. The data processing method of claim 8, wherein step of adaptively adjusting the compression algorithm comprises:
referring to at least a scaling factor associated with a de-compressed multimedia data to be derived from the output multimedia data to adaptively adjust the compression algorithm.

12. The data processing method of claim 11, wherein the compression algorithm is set by a fifth compression algorithm when the scaling factor is higher than a third predetermined threshold, and the compression algorithm is set by a sixth compression algorithm when the scaling factor is not higher than the third predetermined threshold, where the sixth compression algorithm is different from the fifth compression algorithm.

13. The data processing method of claim 12, wherein when the scaling factor is a scaling-up factor, the fifth compression algorithm is more complex than the sixth compression algorithm; and when the scaling factor is a scaling-down factor, the fifth compression algorithm is less complex than the sixth compression algorithm.

14. The data processing method of claim 8, wherein the third compression algorithm is more complex than the fourth compression algorithm.

15. A data processing apparatus comprising:
a compressor, arranged for receiving an input multimedia data, and generating an output multimedia data according to the input multimedia data; and
an output interface, arranged for packing the output multimedia data into an output bitstream, and outputting the output bitstream via a camera interface to a second apparatus;
wherein the compressor adaptively adjusts a compression algorithm applied to the input multimedia data according to visibility of compression artifacts by referring to at least a pixel density of a display apparatus, referring to at least a scaling factor associated with the input display data, or referring to at least a distance between the display apparatus and a viewer of the display apparatus; and
wherein the data processing apparatus and the second apparatus are located at different chips, respectively; the compressor and the output interface are included in a first chip, the second apparatus is included in a second chip; and the camera interface is a chip-to-chip interface that provides direct pin connections between the first chip and the second chip.

16. A data processing method comprising:
receiving an input multimedia data;
adaptively adjusting a compression algorithm according to visibility of compression artifacts by referring to at least a pixel density of a display apparatus, referring to at least a scaling factor associated with the input display data, or referring to at least a distance between the display apparatus and a viewer of the display apparatus;
generating an output multimedia data according to the compression algorithm and the input multimedia data in a first chip; and
packing the output multimedia data into an output bitstream in the first chip, and outputting the output bitstream via a camera interface to a second apparatus included in a second chip different from the first chip, wherein the camera interface is a chip-to-chip interface that provides direct pin connections between the first chip and the second chip.

* * * * *